United States Patent
Nelson et al.

(10) Patent No.: US 8,704,186 B2
(45) Date of Patent: Apr. 22, 2014

(54) ACTIVE NOISE CANCELING SYSTEM FOR MECHANICALLY COOLED GERMANIUM RADIATION DETECTORS

(75) Inventors: Karl Einar Nelson, Livermore, CA (US); Morgan T. Burks, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 577 days.

(21) Appl. No.: 12/948,695

(22) Filed: Nov. 17, 2010

(65) Prior Publication Data

US 2011/0147597 A1 Jun. 23, 2011

Related U.S. Application Data

(60) Provisional application No. 61/262,062, filed on Nov. 17, 2009.

(51) Int. Cl.
  *G01T 1/24* (2006.01)
  *H04B 15/00* (2006.01)
  *H03F 1/26* (2006.01)

(52) U.S. Cl.
  USPC .......... 250/370.06; 702/8; 702/191; 702/194; 702/195

(58) Field of Classification Search
  CPC ............ G01T 1/24; G01T 1/17; H04B 1/123; G01R 29/26; G01R 19/2506; H03H 21/0012; H03H 21/0043
  USPC .................. 250/370.06; 702/8, 191, 194, 195
  See application file for complete search history.

(56) References Cited

U.S. PATENT DOCUMENTS

| | | | | |
|---|---|---|---|---|
| RE30,904 E | * | 4/1982 | Miller et al. | 250/370 |
| 5,532,944 A | * | 7/1996 | Battista | 708/3 |
| 5,689,572 A | * | 11/1997 | Ohki et al. | 381/71.3 |
| 5,751,902 A | | 5/1998 | Hofmann | |
| 5,805,480 A | | 9/1998 | Greenberg | |
| 5,805,637 A | * | 9/1998 | Hirosaka et al. | 375/230 |
| 5,933,194 A | * | 8/1999 | Kim et al. | 348/403.1 |
| 6,347,288 B1 | * | 2/2002 | Trammell et al. | 702/107 |
| 6,888,949 B1 | | 5/2005 | Vanden Berghe et al. | |
| 7,225,135 B2 | * | 5/2007 | Thomas | 704/500 |
| 7,468,696 B2 | * | 12/2008 | Bornholdt | 342/387 |
| 8,325,014 B1 | * | 12/2012 | Sundstrom et al. | 340/10.1 |
| 2008/0092556 A1 | * | 4/2008 | Stein et al. | 62/45.1 |

OTHER PUBLICATIONS

Han, et al., "Nonlinear Effects of the LMS Adaptive Predictor for Chirped Input Signals", EURASIP Journal on Applied Signal Processing 2002, vol. 1, pp. 21-29 (2002).

Goldenstein, "A Gentle Introduction to Predictive Filters", Instituto de Computacao, RITA, 29 pages (2004).

* cited by examiner

*Primary Examiner* — David Porta
*Assistant Examiner* — Mindy Vu
(74) *Attorney, Agent, or Firm* — James S. Tak

(57) ABSTRACT

A microphonics noise cancellation system and method for improving the energy resolution for mechanically cooled high-purity Germanium (HPGe) detector systems. A classical adaptive noise canceling digital processing system using an adaptive predictor is used in an MCA to attenuate the microphonics noise source making the system more deployable.

10 Claims, 2 Drawing Sheets

ACTIVE NOISE CANCELING SYSTEM FOR MECHANICALLY COOLED GERMANIUM RADIATION DETECTORS

CLAIM OF PRIORITY IN PROVISIONAL APPLICATION

This application claims priority in provisional application filed on Nov. 17, 2009, entitled "Active Noise Canceling System for Mechanically Cooled Germanium Radiation Detectors" application No. 61/262,062 by Karl E. Nelson et al, and incorporated by reference herein.

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND OF THE INVENTION

A. Technical Field

The present invention relates to noise cancellation techniques, and more particularly to a method and system for actively canceling microphonics noise in radiation detectors using a multi-channel analyzer with an adaptive predictor for adaptive signal processing.

B. Description of the Related Art

High-purity Germanium (HPGe) detection systems are used to measure gamma ray spectroscopy to detect and identify radiological sources in the field. They do so by using highly sensitive preamplifiers which convert the electrons from each gamma ray detection event into an electrical signal. These detectors must operate at cryogenic temperatures and thus field operations require mechanical cooling solutions. Unfortunately, mechanical vibrations from the cooler are also converted to electrical signals by inducing changes in capacitance which are translated by the preamplifier into microphonic noise. To address the microphonics phenomenon, often a series of mechanical dampers and electrical filters are used to attenuate and cancel microphonic noise.

In the field of adaptive signal processing, adaptive filters (and adaptive processors generally) adapt their performance based on an input signal by self-adjusting their transfer functions according to an optimization algorithm. Such adaptive filters are often digital filters in a digital processing system for use in such example applications as speech-processing and noise cancellation, both of which involve continuous time processing where there are no periods in which the adaptation is switched between training and predicting.

In radiation detection applications and nuclear physics, however, adaptive filters and processers are not used in any of the four traditional configurations of prediction, system identification (modeling), equalization (deconvolving, inverse filtering, or inverse modeling) or interference canceling. There is a disconnect between the two fields of adaptive signal processing and nuclear physics because the signals in nuclear physics are random pulses for which only the timing, energy and occasionally the decay constant are considered useful. This is quite different from signal processing in which phase and magnitude of discrete versions of continuous time signals are considered.

SUMMARY OF THE INVENTION

One aspect of the present invention includes a standalone multichannel analyzer (MCA) for collecting and analyzing radiation data, comprising: a preamplifier for converting a charge pulse of a radiation detection event into an analog signal characterized by a step rise from an external preamplifier; an anti-aliasing filter for bandlimiting the analog signal and having means for adjusting gain and offset; an analog to digital converter (ADC) which converts the analog signal from the anti-aliasing filter to a digital signal; and a digital processor for processing the digital signal to produce an energy and time associated with the arrival of each radiation pulse, said digital processor including a pulse shaping filter for converting the step rise of the charge pulse into a unipolar shaped pulse, and an adaptive predictive filter for removing a predicted signal from the output of the pulse shaping filter.

Another aspect of the present invention includes a radiation detection system, comprising: a data collection system comprising: a semiconductor radiation detector material; a mechanical cooler for cooling the radiation detector material; a high voltage power supply; a preamplifier for converting a charge pulse of a radiation detection event into an analog signal characterized by a step rise from an external preamplifier; an anti-aliasing filter for bandlimiting the analog signal and having means for adjusting gain and offset; a digital sampling system for sampling a detector output channel at a regular time period; and an analog to digital converter (ADC) which converts the analog signal from the anti-aliasing filter to a digital signal; and a digital processor for processing the digital signal to produce an energy and time associated with the arrival of each radiation pulse, said digital processor including a pulse shaping filter for converting the step rise of the charge pulse into a unipolar shaped pulse, and an adaptive predictive filter for removing a predicted signal from the output of the pulse shaping filter.

Generally, the present invention is a new design for a multichannel analyzer (MCA) and a radiation detector system using such MCA, which uses classical adaptive filtering techniques (i.e. adaptive predictor) to attenuate microphonic noise from mechanical vibrations and thus improve the energy resolution of mechanically cooled radiation detector instruments, such as high-purity Germanium (HPGe) detector systems. Radiation detection signals are very confined in time, i.e. impulse, but very large. Their large nature is such that even coincidental correlations with the noise in the adaptation will cause the coefficients of the adaptation feedback to be grossly distorted in the presence of the signal. However, because radiation detection signals are so well confined in time, the present invention can add new functions to the adaptive processor by utilizing knowledge of other available information in the system to avoid the difficulties from direct application of traditional signal processing. The system of the present invention has periods in which the adaptation is switched between training and predicting. Deltas (delays to the input signal) are inserted such that we insure that the predictive filter is not using any information around the arrival of the signal not just to insure lack of correlation in training.

As a microphonic noise-canceling radiation detector system, the present invention generally includes two main subsystems: (1) a data collection system, and (2) a computer or other digital processing system with an adaptive predictor for processing digital signals received from the data collection system to produce energy and time values associated with gamma ray detection events. The data collection system includes (1) a semiconductor radiation detector typically which further includes a HPGe detector mounted in a cryostat, a mechanical cooler such as a cryogenic cooler, a preamplifier which converts a charge pulse into a voltage or a buffer which takes a step rise from an external preamplifier, an anti-aliasing filter, an ADC, and a high voltage supply; and (2) a digital sampling system which samples the detector output channel at a regular time period. And the digital processing system includes a shaper (i.e. pulse shaping filter/amplifier) which converts the step rise into a unipolar shaped pulse, and an adaptive filter for removing a predicted signal from the output of the pulse shaping filter. And as an MCA, the present invention may be characterized as including the preamplifier, anti-aliasing filter, ADC, and digital processing system, without the front end detection and sampling components or functionality.

The digital processing system performs the following actions. First the digital signal from detector's ADC is shaped with a digital pulse shaping filter, or simply "shaper". This shaper is typically implemented, for example, with a trapezoidal filter with the transfer function:

$$H(z) = \frac{1 - z^{-P} - z^{-P-G} + z^{-2P-G}}{1 - z^{-1}}$$

And the shaper often includes a pole-zero compensation system, characterized by:

$$G(z) = \frac{1 - \tau z^{-1}}{1 - z^{-1}}$$

In addition, downsampling may be performed after the shaping filter if required.

The digital processing system also includes an adaptive noise removing circuit which implements an adaptive filter arranged as an adaptive predictor (and having either a finite impulse response (FIR) or infinite impulse response (IIR) structure) to output the non-predictive portion e(t) (i.e. error signal or cost function) where:

$$e(t) = y(t) - \sum_i w_i(t-1)d(t-i)$$

$$d(t) = y(t-N)$$

$$w_i(t) = w_i(t-1) + \lambda e(t)d(t-i)$$

and where y(t) is the undelayed input signal, d(t) is the delayed input signal, with $w_i(t)$ is the filter's transfer function, and $$\sum_i w_i(t-1)d(t-i)$$

is the predicted signal value.

The digital processing system also implements a system to detect if the signal is over a threshold value and locks the system into pure predictive mode such that no adaptation occurs during the gamma ray event. In other words, if y(t)>K, w is not updated and $$d(t) = \sum_i w_i(t-1)d(t-i).$$

Following the end of the shaped event d(t) is allowed to update, but $w_i(t)$ is not until all elements of d(t) are clear of the event time period. And an algorithm finds the maximum of e(t) during the event time period to record the energy of the pulse.

The microphonic noise canceling technique/algorithm described above has been tested in simulation with noise having similar characteristics to the real mechanically-cooled radiation detection system, and showed a considerable improvement in performance such that the microphone noise was reduced to the same magnitude as the sum of all other noise sources.

BRIEF DESCRIPTION OF THE DRAWINGS

The accompanying drawings, which are incorporated into and form a part of the disclosure, are as follows.

DETAILED DESCRIPTION

Figure 1:
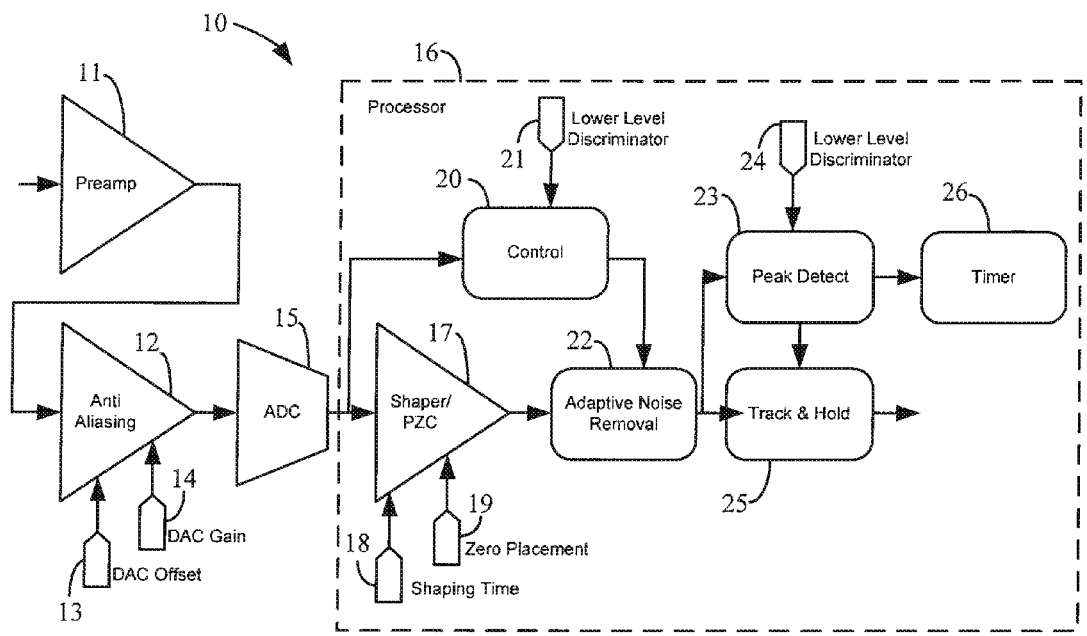
FIG. 1 is a signal processing diagram of an example embodiment of the MCA of the present invention.

Turning now to the drawings, FIG. 1 shows a first exemplary embodiment of an improved MCA of the present invention, generally indicated at 10. The MCA 10 includes a preamplifier 11 which takes a current pulse from the detector and transforms it into a step function as well as providing a very large amplification. This step function has a decay time associated with it. The amplification serves to increase the intensity of the signal such that electric noise of all further steps is insignificant. While the preamplifier is sometimes characterized as a separate function from the operations of the MCA, the present invention incorporates the preamplifier as part of the MCA since the adaptive filtering in the MCA requires knowledge of this preamplifier function. In any case, the preamplifier output is provided to the anti-aliasing filter 12, shown having DAC offset control 13, and DAC gain control 14. Output from the anti-aliasing filter/amplifier 12 is then outputted to the ADC 15 which converts the analog signal of the radiation detection event to a digital signal.

The digital signal from the ADC 15 is then processed by the digital processing system, generally indicated at 16. In particular, the digital signal is processed by a shaper and pole/zero compensation filter 17 for pulse shaping/amplifying and pole/zero cancellation. The shaper 17 converses the step response back into a pulse with a specific time length called the shaping time, shown controlled at 18. As the step function from the preamplifier is not perfect, a pole-zero cancellation filter (or simply "PZC") is used to remove or cancel the pole from the preamplifier and introduce an ideal pole which would produce an ideal step function. The zero in the PZC must match the preamplifier and thus be tunable, shown by control 19. The result is to make the preamplifier appear to be perfect. Although the shaper and PZC are linear components, the range signals must be finite and thus the order of these two elements is generally fixed with the shaper first and the PZC second. Analog designs often blur these functions thus the pole cancellation (the tunable zero) may appear first, while the pole portion may be last. The shaping filter may be a trapezoidal shaper which accounts for variations in pulse shape.

Figure 3:
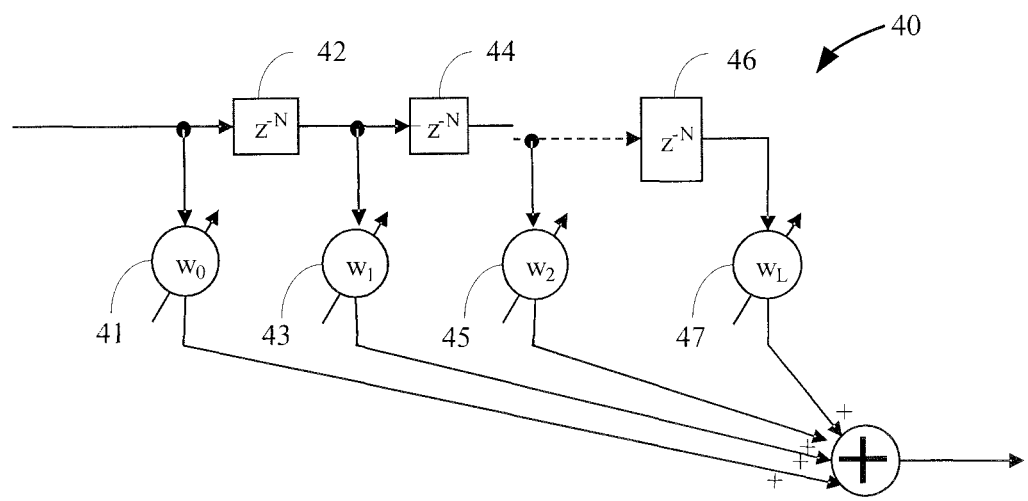
FIG. 3 is a signal processing diagram of an example embodiment of a single-input adaptive transversal filter of the present invention.
Figure 4:
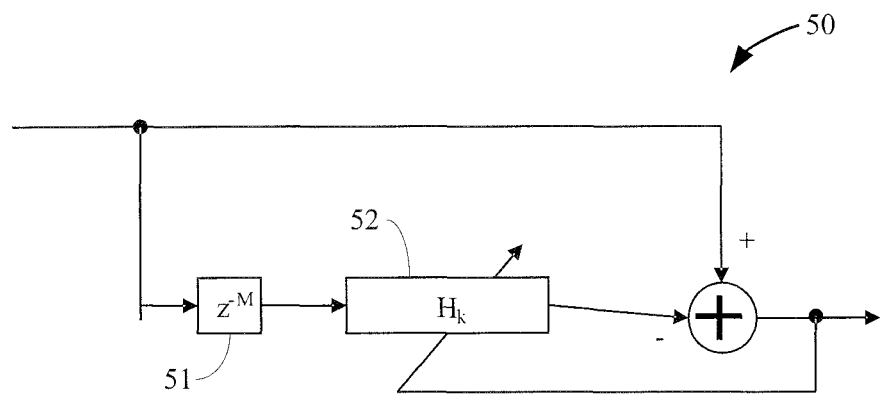
FIG. 4 is a signal processing diagram of an example embodiment of an adaptive predictor of the present invention.

The digital processing system 10 also includes an adaptive noise removing circuit shown at 22 which implements an adaptive FIR or IIR filter 52 (shown in FIG. 4 arranged in an adaptive predictor 50) to output the non-predictive portion e(t) as discussed in the Summary. The adaptive noise removal circuit 22 can be switched between training and predictive modes. When in predictive mode, the adaptive filter substitutes predicted values for all samples which are corrupted by the assumed shape resulting from a pulse determined by the peak detector. The training decision may have a stretcher (for example 36) to implement hysteresis to prevent training on rising edge of pulse. Control 20 is based on the undelayed input signal from the ADC, with a lower level discriminator 21 as input. As shown in FIG. 3, the adaptive filter may be a FIR filter implemented as a "single-input transversal filter." To represent the low frequencies of the microphonics noise, the taps 42-46 were spaced with a delay greater than 1 (typically 5-10), but the exact spacing depends on the noise characteristics and sampling rate. Non-regular taps seem like they may have an advantage as they could potentially capture a greater range of frequencies.

Figure 2:
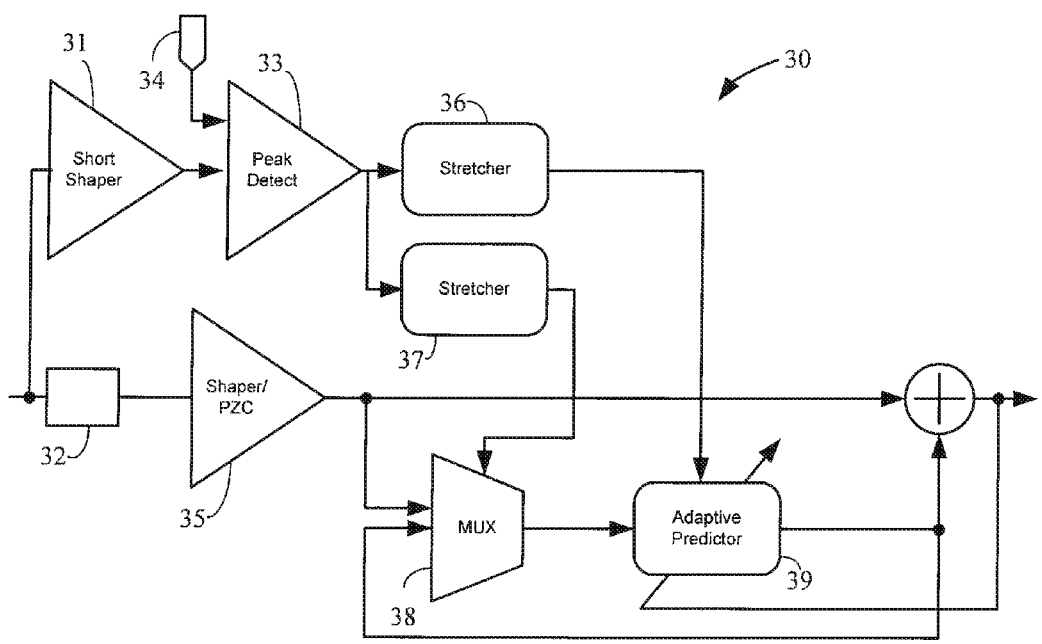
FIG. 2 is a signal processing diagram of an example embodiment of a detailed adaptive filter with control of the present invention.

The adaptive filter 39 in FIG. 2 operates in a predictive fashion, i.e. as an adaptive predictor. A range of lag values is possible from one to several times the tap delay without. The update routine was a Newton algorithm such that:

$$q_n = \begin{cases} d_n & control_1 == 0 \\ w_n & control_1 == 1 \end{cases}$$

$$X_n = [q_{n-1} \ q_{n-1-P} \ q_{n-1-2P} \cdots q_{n-1-kP}]^T$$

$$R_{n+1} = (1-\tau)R_n + \tau X_n X_n^T$$

$$P_{n+1} = (1-\tau)P_n + \tau X_n d_n$$

$$w_{n+1} = \begin{cases} (1-\kappa)w_n + \kappa R_{n+1}^{-1} P_n & control_2 == 0 \\ w_n & control_2 == 1 \end{cases}$$

It is possible for control 1 and control 2 to be the same signal (of control 20 in FIG. 1), but this can lead to instability in the event than multiple pulses arrive in a short time frame. Control 1 locks the adaptive predictor into prediction mode during the arrival of the pulse to ensure that we do not subtract away a portion of the energy from the radiation pulse. It must last at least until the maximum is recorded. Because this must switch prior to the arrival of the radiation signal at the adaptive filter, either a separate shaper or the shaper output must be delayed by at least one half the shaping as shown by shapers 31 and 35 in FIG. 2. Control 2 prevents the adaptive filter from updating while the radiation pulse is being processed and in addition while some substantial fraction of the states in the adaptive filter hold predicted as opposed to observed values. Because of this additional requirement, the functionality of the control signals are split. Constants $\tau$ and $\kappa$ are chosen on by optimization of the performance on training samples.

The optimization required to determine the training constants and the delays, it given by sampling noise and asserting a radiation pulse has occurred at some regular frequency. No actual radiation signal is required, but instead the standard deviation of the predicted minus the observed is measured. The better this baseline is predicted the better the noise performance of the system will be.

It is appreciated that the delay (32 in FIG. 2) and the energy shaper (35) can be reverse and with a sufficiently long delay, the shaper (35) and short shaper (31) could in principle be the same element. However, they are drawn separately, because there may be times in which the short shaper may benefit from a different design. Also the short shaper (31) does not need pole zero compensation. In addition having the short shaper have a significantly shorter shaping time allows the system the possibility of identifying piled up pulses where two radiation signals arrive in a short period of time.

The actions of the pulse stretchers 36 and 37 in FIG. 2 operates as follows. When the short shaper triggers it is known that a radiation pulse is arriving but do not know its center yet. Thus the blanking is started assuming that this was the peak of signal, that is we must blank for a count of the length of the shaping time. However, if short shaper 31 output stays high we know that the peak (determined by peak detector 33) was actually later in time and thus the time remaining needs to increase by only one half of a sample of every additional time period that short shaper 31 is over the threshold. Thus the first pulse stretcher 37 operates to lock the system in pure predictive mode as described in the Summary, and controls the MUX so that the selected input for the adaptive predictive filter 39 is the predicted signal output from the adaptive predictive filter, i.e.

$$d(t) = \sum_i w_i(t-1)d(t-i).$$

For the second pulse stretcher 36, it must wait until the predictive values have largely cleared the adaptive filter 39. Failure to do so will mean that error in prediction will be incorporated into the weights of the adaptive filter. If a second or third radiation pulse arrives before this portion of the incorporated error is cleared, the predicted values can become increasingly unstable resulting in undesirable behavior. Thus the second pulse stretcher is used to avoid it by not allowing $w_i(t)$ to update until all elements of d(t) are clear of the event time period, as described in the Summary.

After adaptive noise removal is performed at 22 in FIG. 1, two subsequent functions are performed with the shaped signal. The first is a peak detect function performed at 23 which determines if the shaped signal has exceeded a specified value. The output of this trigger will be delayed and is then used to trigger the ADC and decide when the system will be locked out from a second pulse which may appear while the system is recovering from the previous pulse. The energy and time (via timer 26) may be recorded into memory (not shown). This recovery time results in a system "dead time." A second continuous circuit called a track & hold circuit shown at 25. Traditionally this is implemented as a diode and a rectifier which serve to grab and hold the maximum signal which occurs in the time window around the trigger. Alternately a timed sample and hold circuit could serve this function.

Though not shown in FIG. 1, it is appreciated that the system 10 also includes the supporting circuitry to enable operation, such as for example: the pulse pileup detector which looks for multiple pulses in a given time window, timers to estimate the count rate or dead time, a timer which time stamps the pulse (for list mode application), a histogramming circuit which bins the energy to form a spectrum, a gain control feedback system which locks onto a peak in the spectrum and dynamically adjusts the gain of the shaper to compensate for system drift, etc. These function are would all be considered an enhancements of the basic operation of an MCA.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A standalone multichannel analyzer (MCA) for collecting and analyzing radiation data, comprising:
    a preamplifier for converting a charge pulse of a radiation detection event into an analog signal characterized by a step rise from an external preamplifier;
    an anti-aliasing filter for bandlimiting the analog signal and having means for adjusting gain and offset;
    an analog to digital converter (ADC) which converts the analog signal from the anti-aliasing filter to a digital signal; and
    a digital processor for processing the digital signal to produce an energy and time associated with the arrival of each radiation pulse, said digital processor including:
        a digital pulse shaping filter for converting the step rise of the digital signal into a unipolar shaped digital pulse;
        an adaptive noise removal circuit comprising an adaptive predictive filter and adapted to remove a predicted signal produced by said adaptive predictive filter from the unipolar shaped digital pulse output of the digital pulse shaping filter, and a multiplexor adapted to provide as input to the adaptive predictive filter either output from the digital pulse shaping filter or the predicted signal output from the adaptive predictive filter; and
        a control circuit adapted to switch the adaptive noise removal circuit between training and prediction modes of operation, to lock the adaptive noise removal circuit in the prediction mode of operation during a radiation detection event so that the adaptive filter is not updated during the radiation detection event, and to update weights of a transfer function of the adaptive predictive filter in the training mode of operation.

2. The MCA of claim 1,
wherein the digital pulse shaping filter includes a trapezoidal shaper.

3. The MCA of claim 1,
wherein the digital pulse shaping filter includes a pole-zero compensation filter for compensating for finite decay of the preamplifier.

4. The MCA of claim 1,
wherein the digital processor further includes a track and hold circuit adapted to take a maximum signal from the digital pulse shaping filter minus the predicted signal.

5. The MCA of claim 1,
wherein the control circuit comprises:
    a short shaper filter for predicting the arrival of a radiation pulse in advance of the digital signal output from the ADC reaching the adaptive predictive filter by comparing the digital signal from the ADC against a threshold value,
    a peak detector connected to the receive output from the short shaper filter, and
    first and second pulse stretchers connected to receive in parallel output from the peak detector, wherein the first pulse stretcher is operably connected to the multiplexor for selecting the predicted signal output from the adaptive predictive filter as input to the adaptive predictive filter during a radiation detection event, and for stretching the output from the peak detector during the radiation detection event such that the radiation pulse will have passed through the shaper prior to release from the locked prediction mode of operation, and wherein the second pulse stretcher is operably connected to the adaptive predictive filter for stretching the output from the peak detector until predictive inputs have cleared the adaptive predictive filter whereupon the output from the peak detector as input to the adaptive predictive filter.

6. A radiation detection system, comprising:
a data collection system comprising: a semiconductor radiation detector material; a mechanical cooler for cooling the radiation detector material; a high voltage power supply; a preamplifier for converting a charge pulse of a radiation detection event into an analog signal characterized by a step rise from an external preamplifier; an anti-aliasing filter for bandlimiting the analog signal and having means for adjusting gain and offset; a digital sampling system for sampling a detector output channel at a regular time period; and an analog to digital converter (ADC) which converts the analog signal from the anti-aliasing filter to a digital signal; and
a digital processor for processing the digital signal to produce an energy and time associated with the arrival of each radiation pulse, said digital processor including:
    a digital pulse shaping filter for converting the step rise of the digital signal into a unipolar shaped digital pulse,
    an adaptive noise removal circuit comprising an adaptive predictive filter and adapted to remove a predicted signal produced by said adaptive predictive filter from the unipolar shaped digital pulse output of the digital pulse shaping filter, and a multiplexor adapted to provide as input to the adaptive predictive filter either output from the digital pulse shaping filter or the predicted signal output from the adaptive predictive filter, and
    a control circuit adapted to switch the adaptive noise removal circuit between training and prediction modes of operation, to lock the adaptive noise removal circuit in the prediction mode of operation during a radiation detection event so that the adaptive filter is not updated during the radiation detection event, and to update weights of a transfer function of the adaptive predictive filter in the training mode of operation.

7. The radiation detection system of claim 6,
wherein the digital pulse shaping filter includes a trapezoidal shaper.

8. The radiation detection system of claim 6,
wherein the digital pulse shaping filter includes a pole-zero compensation filter for compensating for finite decay of the preamplifier.

9. The radiation detection system of claim 6,
wherein the digital processor further includes a track and hold circuit adapted to take a maximum signal from the digital pulse shaping filter minus the predicted signal.

10. The radiation detection system of claim 6,
wherein the control circuit comprises:
    a short shaper filter for predicting the arrival of a radiation pulse in advance of the digital signal output from the ADC reaching the adaptive predictive filter by comparing the digital signal from the ADC against a threshold value,
    a peak detector connected to the receive output from the short shaper filter, and first and second pulse stretchers connected to receive in parallel output from the peak detector, wherein the first pulse stretcher is operably connected to the multiplexor for selecting the predicted signal output from the adaptive predictive filter as input to the adaptive predictive filter during a radiation detection event, and for stretching the output from the peak detector during the radiation detection event such that the radiation pulse will have passed through the shaper prior to release from the locked prediction mode of operation, and wherein the second pulse stretcher is operably connected to the adaptive predictive filter for stretching the output from the peak detector until predictive inputs have cleared the adaptive predictive filter whereupon the output from the peak detector as input to the adaptive predictive filter.

\* \* \* \* \*